July 22, 1952  C. A. BROWN  2,604,310
CARBONATOR
Filed March 23, 1949  2 SHEETS—SHEET 1

Inventor:
Clyde A. Brown,
By Dawson, Ooms, Brothers Spangenberg,
Attorneys.

July 22, 1952 — C. A. BROWN — 2,604,310
CARBONATOR
Filed March 23, 1949 — 2 SHEETS—SHEET 2

Inventor:
Clyde A. Brown,
By Davern, Osms, Borth and Morgenberg,
Attorneys.

Patented July 22, 1952

2,604,310

UNITED STATES PATENT OFFICE 2,604,310

CARBONATOR

Clyde A. Brown, Luck, Wis., assignor, by mesne assignments, to General Bronze Corporation, a corporation of New York Application March 23, 1949, Serial No. 82,979

4 Claims. (Cl. 261—35)

This invention is directed to carbonators for carbonating water and more particularly to pump type carbonators.

The principal object of this invention is to provide a pump type carbonator for automatically supplying carbon dioxide and water to a carbonator tank wherein the water is carbonated in the carbonator tank in desired and fixed ratios of carbon dioxide and water, wherein the carbon dioxide and water are automatically supplied in the desired ratio to the carbonator tank whenever carbonated water is withdrawn therefrom to maintain the carbonator tank full of carbonated water, wherein all of the carbon dioxide is absorbed by the water so that the carbonator tank will not become gas bound, wherein the automatic supply of carbon dioxide and water to the carbonator tank is accomplished without the use of complicated and extraneous control equipment and valves, and wherein the pressure of the carbon dioxide is utilized for pumping the water into the carbonator tank.

In carrying out this object of the invention a carbonator pump is utilized for automatically supplying carbon dioxide and water to the carbonator tank at intermediate carbonating pressure from a source of carbon dioxide at high pressure and a source of water at low pressure. It includes a fluid pump adapted to communicate with the source of water at low pressure and the carbonator tank intermediate pressure for supplying water to the carbonator tank at the intermediate pressure and, also, a fluid motor connected to the pump and adapted to communicate with the source of carbon dioxide at high pressure and the carbonator tank at intermediate pressure for driving the pump and at the same time supplying carbon dioxide to the carbonator tank at the intermediate pressure. The carbon dioxide carbonates the water in the carbonator tank. The pump and the motor are adapted to be subjected to the pressure in the carbonator tank and are placed automatically in operation upon a decrease in pressure therein caused by drawing carbonated water therefrom. In this way the carbonator tank is automatically maintained full of carbonated water. The carbonator tank may be refrigerated and maintained at proper carbonating temperature and pressure. The fluid pump and motor may be of the positive displacement type to assure proper metering and ratio of carbon dioxide and water. All of the carbon dioxide is absorbed by the water in the carbonator tank to prevent the same from becoming gas bound.

The carbonator of this invention is particularly useful in connection with soda fountains, bars and the like for producing carbonated water for beverage dispensing purposes. The fountain dispensing apparatus may be connected directly to the carbonator tank and as carbonated water is drawn therefrom it will be automatically replenished by the carbonator of this invention.

Other objects of this invention reside in the details of construction of the carbonator and the cooperative relationship between the component parts thereof.

Further objects and advantages of this invention will become apparent to those skilled in the art upon reference to the accompanying specification, claims, and drawings.

Figure 1:
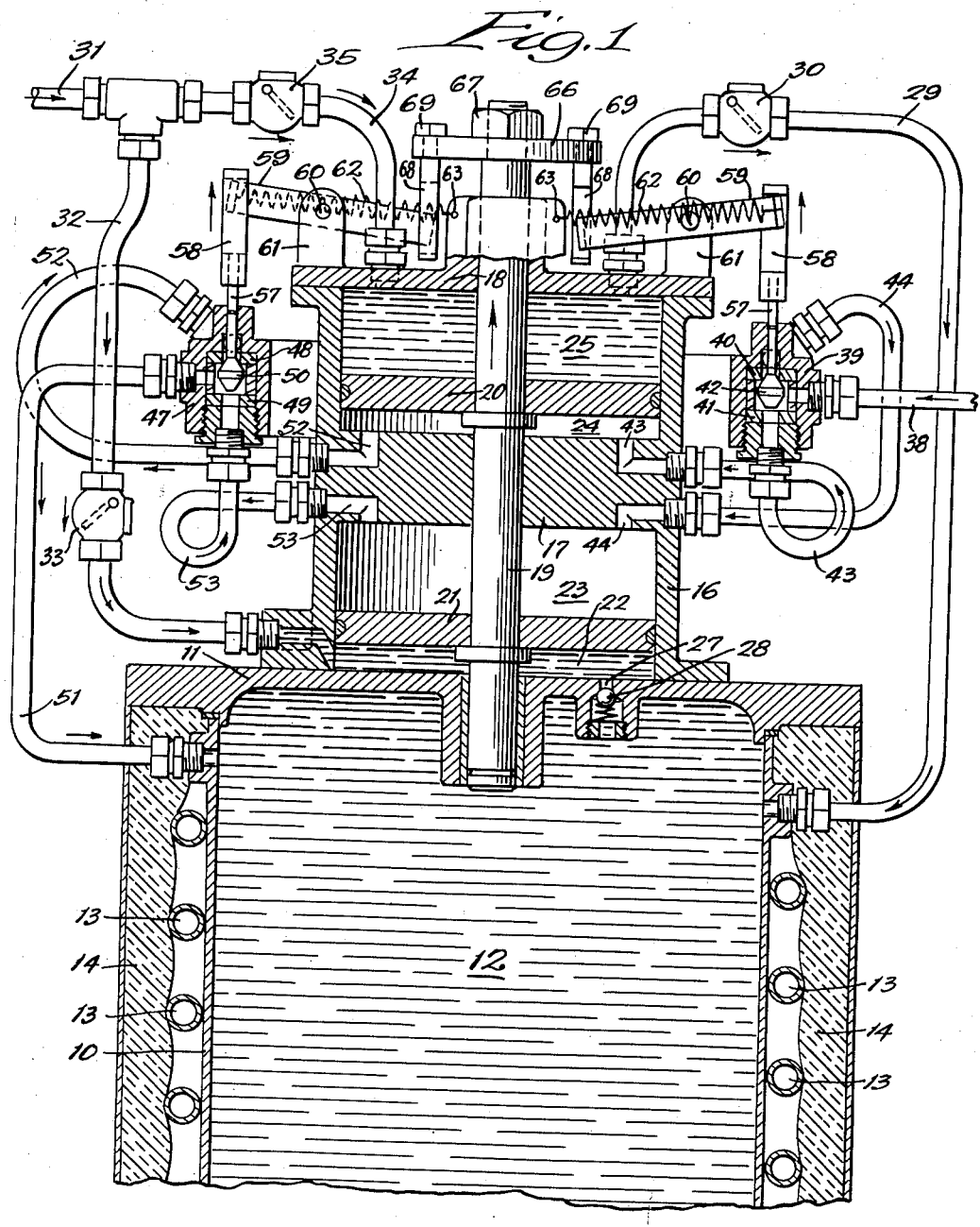
Figure 1 is a vertical sectional view through the carbonator of this invention.
Figure 2:
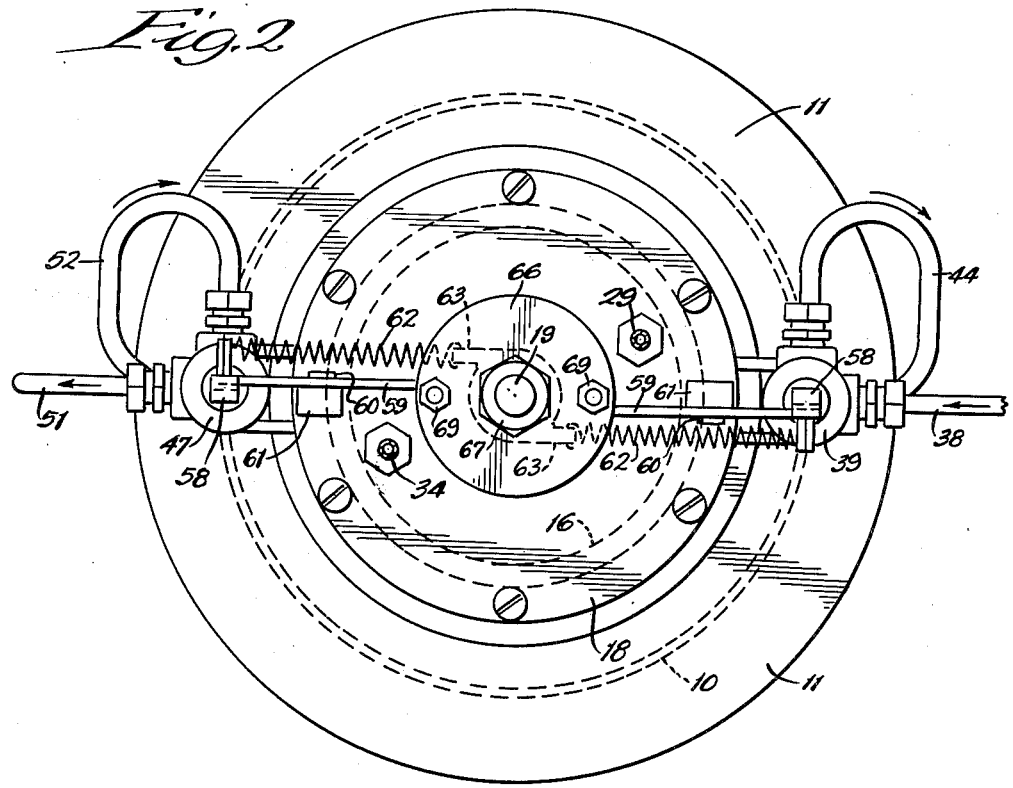
Figure 2 is a top plan view thereof.

The carbonator includes a carbonator tank 10 having a head 11 secured thereto to form a carbonator tank chamber 12 in which carbon dioxide gas is absorbed by water to form carbonated water. Preferably, the carbonator tank is refrigerated by cooling coils 13 and insulation 14 may be utilized for increasing the refrigerating efficiency of the coils. The carbonator tank is preferably kept within 40 to 60° F. by the refrigerating coils so that all of the carbon dioxide introduced into the tank will be absorbed by the water therein, the pressure in the tank being maintained at substantially 75 lbs. per sq. in. The carbonator tank is provided with a discharge outlet, not shown, for withdrawing carbonated water therefrom. Such discharge outlet may be connected to a dispensing apparatus for beverage dispensing purposes.

Mounted on the head 11 of the carbonator tank is a carbonator pump which may be of the double acting positive displacement type. It includes a cylinder 16 provided with a partition 17 to provide two chambers therein. The bottom chamber is closed at the bottom end by the head 11 and the top chamber is closed at the top end by a head 18. A piston rod 19 is reciprocatingly received in aligned holes in the head 11, the partition 17 and the head 18 and carries a piston 20 in the upper chamber and a piston 21 in the lower chamber. The piston 21 divides the lower chamber into expansible chambers 22 and 23 and the upper chamber into expansible chambers 24 and 25. The chambers 22 and 25 are pump chambers for pumping water into the carbonator tank and the expansible chambers 23 and 24 are motor chambers supplied with carbon dioxide gas for operating the pump.

The pump chamber 22 is connected by a passage 27 provided with a check valve 28 to the carbonator tank chamber 12 and the pump chamber 25 is likewise connected by a passage 29 having a check valve 30 to the carbonator tank chamber 12. A pipe 31 leading from a source of water communicates through a passage 32 having a check valve 33 with the pump chamber 22, and also, communicates through a passage 34 having a check valve 35 with the pump chamber 25. Thus, as the pistons 20 and 21 are reciprocated, water is pumped from the source of water into the carbonator chamber 12. The pump illustrated is of the double acting positive displacement type.

Figure 3:
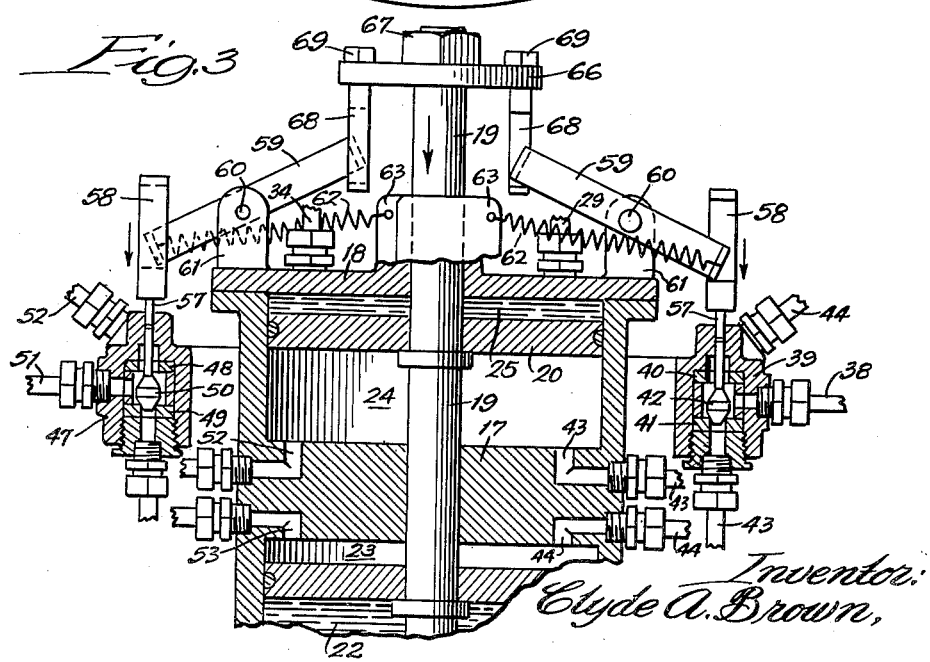
Figure 3 is a vertical sectional view through a part of the carbonator similar to Figure 1, but showing the parts in a different position.

A pipe 38 extends from a source of carbon dioxide gas under pressure and connects to the interior of a three way inlet valve 39 having an upper valve seat 40 and a lower valve seat 41. A valve element 42 is interposed between the two seats and when the valve element is in the upper position as shown in Figure 1, carbon dioxide gas is delivered through a passage 43 into the expansible motor chamber 24. When the valve element 42 is in the lower position as illustrated in Figure 3, carbon dioxide gas is transmitted through a passage 44 into the motor expansible chamber 23.

The carbonator pump, also, includes a three way exhaust valve 47 for the motor chambers 23 and 24. It comprises upper and lower ports 48 and 49 and a valve element 50 located therebetween. The exhaust valve 47 is connected by a passage 51 to the carbonator tank chamber 12. When the valve element 50 is in the lower position as illustrated in Figure 3, the expansible chamber 24 communicates with the carbonator tank chamber 12 through a passage 52 and the passage 51. When the valve 50 is in the upper position as illustrated in Figure 1 the expansible chamber 23 communicates through a passage 53 and passage 51 with the carbonator tank 12. Thus, the inlet valve 39 and the exhaust valve 48 control the supply and exhaust of the carbon dioxide gas to and from the expansible motor chambers 23 and 24, the carbon dioxide gas being supplied from a source of carbon dioxide under pressure and the carbon dioxide gas being discharged from the expansible chamber motor into the carbonator tank 12.

The inlet and exhaust valves 39 and 47 are operated in timed relation to provide reciprocating movement to the pistons 20 and 21. In this connection the valve elements 42 and 50 thereof are provided with valve stems 57 carrying yokes 58. A pair of levers 59 are pivoted intermediate their ends at 60 to brackets 61 carried by the head 18, the outer ends of the levers 59 extending into the yokes 58. A spring 62 connects the outer ends of the levers 59 to a stationary support 63 on the head 18, the springs 62 cooperating with the levers 59 for providing an overcenter snap action operation for the inlet and exhaust valves 39 and 47. When the levers 59 are in the position shown in Figure 1, the valves are in the upper positions, and when the levers are snapped over center to the position shown in Figure 3, the valve elements are in the lower position. The outer end of the piston rod 19 carries a plate 66 which is secured thereto by a nut 67. The plate 66 in turn carries a pair of yokes 68 secured thereto by nuts 69. The yokes 68 receive the inner ends of the levers 59 so that as the pistons and piston rod reciprocate, the levers 59 are snapped over center at the end of the reciprocating strokes. The motor chambers 23 and 24 and the inlet and exhaust valves associated therewith provide a double acting positive displacement motor for operating the water pump.

The carbonator pump operates to supply carbon dioxide and water to the carbonator chamber 12 for the purpose of maintaining the latter full of carbonated water. In this connection reference is made to Figure 1 and for purposes of illustrating the operation of this invention it is assumed that the pressure of the source of water is 50 lbs., that the pressure of the source of carbon dioxide gas is 100 lbs., and that the pressure in the carbonator tank is 75 lbs. With the parts in the position shown in Figure 1, the pressure in chamber 22 is therefore 50 lbs., the pressure in chamber 23 is 75 lbs., the pressure in chamber 24 is 100 lbs., and the pressure in chamber 25 is 75 lbs. The pressures thus acting on the pistons 20 and 21 are balanced and the pistons remain stationary. If now, carbonated water is withdrawn from the carbonator tank chamber 12, the pressure therein will be reduced, thereby reducing the pressure in chambers 23 and 25. As a result the pistons 20 and 21 move upwardly to force water from the chamber 25 into the carbonator tank and carbon dioxide gas from the chamber 23 into the carbonator tank. When the pistons reach the upper extremity of their movement, the valves 39 and 47 are reversed to the position shown in Figure 3, and thereupon the pistons 20 and 21 start moving downwardly. Downward movement of the pistons, also, operates to force water and carbon dioxide gas into the carbonator tank 12. When the pistons reach the lower extremity of their movements the valves 39 and 47 are again reversed and the pistons 20 and 21 start another cycle of operation. The pistons 20 and 21 continue reciprocating until the pressure in the carbonator tank chamber 12 is restored to 75 lbs. and this will occur when the carbonator tank 12 is completely filled with carbonated water. Thus, as carbonated water is withdrawn from the carbonator tank, the carbonator pump operates to refill the carbonator tank and replenish the same with carbonated water. The carbon dioxide gas discharged into the water in the carbonator tank 12 is immediately absorbed thereby to form carbonated water and since the temperature within the carbonator tank is maintained at suitable absorption value, all of the carbon dioxide gas discharged therein will be absorbed by the water so that the carbonator tank cannot become gas bound.

While for the purposes of illustration one form of this invention has been disclosed, other forms thereof may become apparent to those skilled in the art upon reference to this disclosure, and therefore, this invention is to be limited only by the scope of the appended claims.

I claims as my invention:

1. In water-carbonating apparatus, in combination, a carbonating tank, a pair of aligned cylinders, a piston rod reciprocable in said cylinders and having an end extending through the head of one of said cylinders, a piston in each of said cylinders secured to said piston rod, said pistons cooperating with said cylinders to define water chambers on one side of each piston and gas chambers on the other side of each piston, water supply conduits connected to each of said water chambers, water transfer conduits connected to each of said water chambers and to said carbonating tank, gas supply conduits connected to each of said gas chambers to supply gas under pressure thereto to reciprocate said pistons, gas transfer conduits connected to each of said gas chambers and to said carbonating tank, first valve means operatively associated with said gas supply conduits, second valve means operatively associated with said gas transfer conduits and linkage mechanism interconnecting said two valve means and said extending end of said piston rod, whereby reciprocation of said piston rod actuates said valve means to cause gas to be alternately delivered to and exhausted from each of said gas chambers.

2. In water-carbonating apparatus, in combination, a carbonating tank, a pair of aligned cylinders mounted on said carbonating tank with a wall of said carbonating tank forming the head of one of said cylinders, a piston rod reciprocable in said cylinders and having an end extending through the head of the other of said cylinders, a piston in each of said cylinders secured to said piston rod, said pistons cooperating with said cylinders to define water chambers on one side of each piston and gas chambers on the other side of each piston, water supply conduits connected to each of said water chambers, water transfer conduits connected to each of said water chambers and to said carbonating tank, one of said water transfer conduits being formed in the wall of said carbonating tank that forms the head of said one cylinder, gas supply conduits connected to each of said gas chambers to supply gas under pressure thereto to reciprocate said pistons, gas transfer conduits connected to each of said gas chambers and to said carbonating tank, first valve means operatively associated with said gas supply conduits, second valve means operatively associated with said gas transfer conduits and linkage mechanism interconnecting said two valve means and said extending end of said piston rod whereby reciprocation of said rod actuates said valve means to cause gas to be alternately delivered to and exhausted from said gas chambers.

3. In water-carbonating apparatus, in combination, a carbonating tank, a first and second aligned cylinder mounted on said carbonating tank with a wall of said carbonating tank forming the head of said first cylinder, a piston rod reciprocable in said cylinders and having its one end extending through the head of said first cylinder into said carbonating tank and its other end extending through the head of said second cylinder, a piston in each of said cylinders secured to said piston rod, said pistons cooperating with said cylinders to define water chambers on the distal sides of said pistons and gas chambers on the proximate sides of said pistons, water supply conduits connected to each of said water chambers, water transfer conduits connected to each of said water chambers and to said carbonating tanks, one of said water supply conduits being formed in the head of said first cylinder, gas supply conduits connected to each of said gas chambers to supply gas under pressure thereto to reciprocate said pistons, gas transfer conduits connected to each of said gas chambers and to said carbonating tank, a first three-way valve operatively associated with said gas-supply conduits, a second three-way valve operatively associated with said gas transfer conduits and a pair of levers pivotally mounted on the head of said second cylinder, said levers being effectively connected at their outer ends to said three-way valves respectively and at their inner ends to said other end of said piston rod whereby reciprocation of said piston rod actuates said three-way valves to cause gas to be alternately delivered to and exhausted from each of said gas chambers.

4. Apparatus according to claim 3 and wherein a spring effectively interconnects the outer end of each of said levers and the head of said second cylinder to provide an over-centering snap action for said three-way valves.

CLYDE A. BROWN.

REFERENCES CITED

The following references are of record in the file of this patent:

UNITED STATES PATENTS

| Number | Name | Date |
|---|---|---|
| 1,126,662 | Stuhler | Jan. 26, 1915 |
| 1,129,362 | Ryder | Feb. 23, 1915 |
| 2,201,040 | Hansen-Ellehammer | May 14, 1940 |
| 2,212,275 | Mojonnier | Aug. 2, 1940 |